(12) United States Patent
Patel

(10) Patent No.: US 7,707,501 B2
(45) Date of Patent: Apr. 27, 2010

(54) VISUAL MARKER FOR SPEECH ENABLED LINKS

(75) Inventor: Paritosh D. Patel, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/200,833

(22) Filed: Aug. 10, 2005

(65) Prior Publication Data

US 2007/0038923 A1 Feb. 15, 2007

(51) Int. Cl.
G06F 17/00 (2006.01)

(52) U.S. Cl. ............... 715/728; 715/205; 715/738; 715/854

(58) Field of Classification Search ......... 715/727–729, 715/203–208
See application file for complete search history.

(56) References Cited

U.S. PATENT DOCUMENTS

| | | | |
|---|---|---|---|
| 5,892,512 | A | 4/1999 | Donnelly et al. |
| 6,286,014 | B1 | 9/2001 | Fukushima et al. |
| 6,342,903 | B1 | 1/2002 | Fado et al. |
| 6,426,761 | B1 | 7/2002 | Kanevsky et al. |
| 6,539,419 | B2 | 3/2003 | Beck et al. |
| 6,567,830 | B1 * | 5/2003 | Madduri ............ 715/235 |
| 6,718,366 | B2 | 4/2004 | Beck et al. |
| 6,744,737 | B1 | 6/2004 | Arkko |
| 6,745,163 | B1 * | 6/2004 | Brocious et al. ........ 704/260 |
| 7,210,098 | B2 * | 4/2007 | Sibal et al. ............ 715/205 |
| 2003/0046401 | A1 | 3/2003 | Abbott et al. |
| 2003/0078781 | A1 | 4/2003 | Julia et al. |
| 2003/0128820 | A1 | 7/2003 | Hirschberg et al. |
| 2003/0151633 | A1 | 8/2003 | George et al. |
| 2003/0158736 | A1 | 8/2003 | James et al. |
| 2003/0202640 | A1 | 10/2003 | Knott et al. |
| 2003/0210280 | A1 | 11/2003 | Baker et al. |
| 2004/0030741 | A1 | 2/2004 | Wolton et al. |
| 2004/0128139 | A1 | 7/2004 | Ilan et al. |
| 2005/0094621 | A1 | 5/2005 | Acharya et al. |
| 2007/0174060 | A1 * | 7/2007 | Jost et al. .............. 704/275 |

FOREIGN PATENT DOCUMENTS

| | | |
|---|---|---|
| JP | 200250734 | 9/2000 |
| JP | 2003248538 | 9/2003 |
| JP | 2004054811 | 2/2004 |
| WO | WO 03/062941 | 7/2003 |

OTHER PUBLICATIONS

U.S. Appl. No. 09/605,612, Lucas, et al.
Nusbickel, W., "Method of Accurately Reflecting State of a Remotely Controlled Entity in a Java GUI Application Using Java Buttons", IBM Corp., RD vol. 444, No. 2, Apr. 2001.

* cited by examiner

Primary Examiner—Doug Hutton
Assistant Examiner—Quoc A Tran
(74) Attorney, Agent, or Firm—Novak Druce + Quigg

(57) ABSTRACT

A method for notifying a user that a link is enabled for activation through voice input. The method can display a visual marker for a hyperlink to indicate that the hyperlink is activatable thorough voice input. The visual marker is not displayed for the hyperlink when the hyperlink is not activatable through voice input even if the hyperlink is activatable through other forms of user input. Visual markers can include such indicators as double underlining the hyperlink, surrounding the hyperlink with a box, and altering the background color of the hyperlink.

15 Claims, 3 Drawing Sheets

VISUAL MARKER FOR SPEECH ENABLED LINKS

BACKGROUND

1. Field of the Invention

The present invention relates to the field of computer software and, more particularly, to the use of visual markers within browsers for identifying links enabled for activation through voice input.

2. Description of the Related Art

On the Internet, links contained within a Web page to other Web pages are marked by an underline and/or a different distinctive color, typically blue. The blue underlining places a user on notice that the text is a link, which can be selected. A user familiar with this visual marker for a link can assume that a Web browser will jump to a linked Web page whenever the user selects (clicks) the link.

Many Web pages are being enabled for speech technologies so that browser users can speak a reference to a link to access the linked Web page in place of or in addition to the conventional option of permitting a user to click upon the link with a mouse or other such device. Speech processing technologies for linking to referenced sites via voice commands are generally implemented on a Web site by Web site basis if not a Web page by Web page basis. Accordingly, some Web sites provide a capability to reference links by voice commands, while others do not. Links enabled for receiving voice commands can be referred to as speech enabled links.

Conventionally, the speech enablement of links occurs by overloading the visual indicator of the link to include voice command as well as click command enablement. This overloading of the links poses an ambiguity to a user since the user does not know if a link can be enabled through voice commands in addition to clicked commands. Accordingly, a user navigating from one Web page to another (as well as from one Web site to another) does not know when links can be activated by voice commands and when this functionality is unavailable. The user presently attempts to issue one or more voice commands to activate a link, and if the voice command repetitively fails, the user will click on the link to activate it instead. The ambiguity relating to whether links are enabled for voice commands or not leads to user confusion and frustration, often causing enabled speech technologies included within browsers to be under utilized. Until the day arrives when all Web links or hyperlinks within Web pages are automatically speech enabled, users will be confused as to which Web link can be voice activated and which cannot.

SUMMARY OF THE INVENTION

The present invention provides a novel marker for voice activatable links in accordance with an embodiment of the inventive arrangements disclosed herein. The novel marker can be displayed in a non-obtrusive manner, which nevertheless places a user on notice as to which links in a Web page are voice activated and which are not. The novel marker can be implemented in a variety of manners, each of which may be user configurable. These implementations for the marker include, but are not limited to, double underlining, placing a box around a link, highlighting the link in a designated color, and/or altering the font color of the text of the link.

In one embodiment of the invention, a user selectable interface option can be provide to selectively turn the speech enabled indicator on or off within the browser, so that users not interested in the novel markers are not distracted by their automatic display. Additionally, the display of the novel markers can be dependent upon system configurations, such as whether a voice input device is present and enabled upon a computing device.

In another embodiment, a microphone activation control can be programmatically linked to the speech enabled indicators. Accordingly, when the speech enabled indicators are activated, a microphone for accepting input can be automatically activated. When the speech enabled indicated are deactivated, the microphone can be automatically deactivated.

Other elements of the device upon which the speech enabled indicators are presented can be similarly linked to the activation of the speech enabled indicators. For example, a speech controls window, popup, menu, and/or toolbar can be automatically enabled when the speech enabled indicators are enabled and can be automatically disabled when the indicators are disabled. Speech controls can include, but are not limited to, such controls as record, play, rewind, fast-forward, pause, and stop.

In another example, a device displaying speech enabled indicators can be a mobile device with device specific buttons having a functionality that is altered depending upon the state of activation of the speech enabled indicators. For example, the device can be a personal data assistant (PDA) having buttons for recording, playing, fast-forwarding, pausing, and the like which can be automatically programmatically linked to speech-enabled links, when the speech enabled indicators are activated. Otherwise, when the speech enabled indicators are deactivated, the buttons of the device can provide functionality unrelated to speech enabled links.

The present invention can be implemented in accordance with numerous aspects consistent with material presented herein. For example, one aspect of the present invention can include a method for notifying a user that a link is enabled for activation through voice input. The method can display a visual marker for a hyperlink to indicate that the hyperlink is activatable through voice input. The visual marker is not displayed for the hyperlink when the hyperlink is not activatable through voice input even if the hyperlink is activatable through other forms of user input. Visual markers can include such indicators as double underlining the hyperlink, surrounding the hyperlink with a box, and altering the background color of the hyperlink.

Another aspect of the present invention can include a visual interface including at least one visual marker for a hyperlink to indicate that the hyperlink is activatable through voice input. The interface can be an interface of a Web browser and the hyperlinks can indicate that the Web browser can jump to a Web page associated with the hyperlink upon selection of the hyperlink. In one embodiment, the Web browser can be a multi-modal Web browser enabled for speech input, keyboard input, and mouse input. In another embodiment, the visual interface can include a user configurable interface that permits a user to configure a font adjustment associated with the visual marker. The font adjustment can include a user configurable adjustment able to adjust font color, background color, font type, font size, font underlining characteristics, and/or font border. The visual marker can be used within the visual interface to indicate that other visual elements within the interface are enabled to accept voice input.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
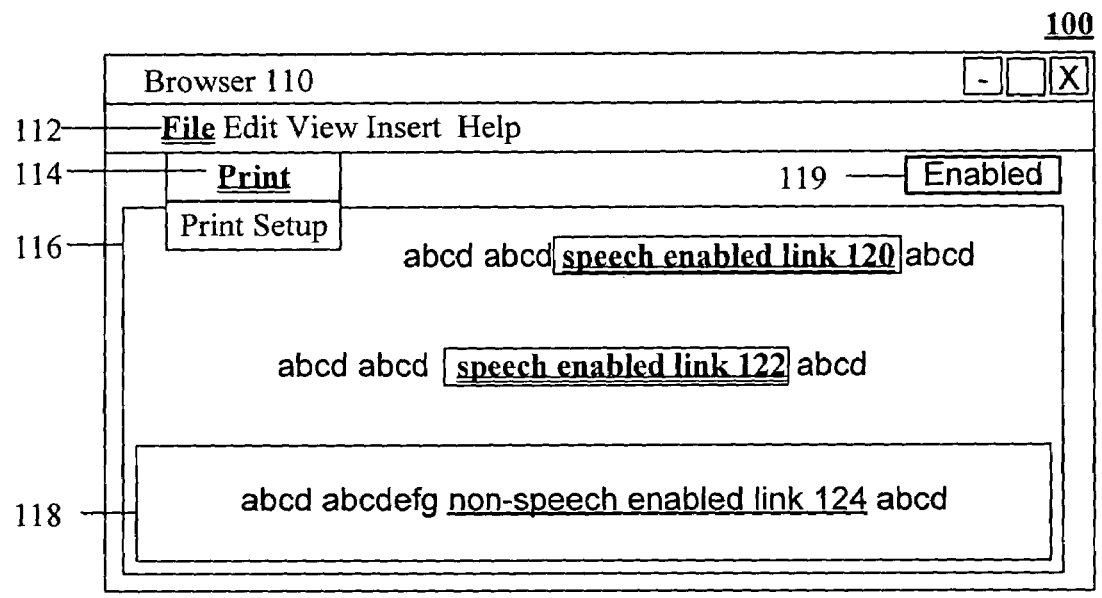
FIG. 1 is a schematic diagram of a visual interface having a visual marker to indicate a hyperlink is activatable through voice input in accordance with an embodiment of the inventive arrangements disclosed herein.

FIG. 1 is a schematic diagram of a visual interface 100 having a visual marker to indicate a hyperlink is activatable through voice input in accordance with an embodiment of the inventive arrangements disclosed herein. The visual interface 110 can be an interface of browser 110, which can be an application capable of visually rendering markup documents. The rendered markup document can include one or more Web pages, such as Web page 116 and Web page 118.

Web page 116 and Web page 118 can both include one or more hyperlinks. A hyperlink can include a graphic or text string which, when selected, opens a new Web page or jumps to a new location in a current Web page. Links 120 and 122 can be referred to as speech-enabled links, which can be activatable through voice input. Links 120 and 122 can also be activatable through mouse selection (clicking). Mouse selection is to be defined generically as including keyboard selection, trackball selection, touch screen selection, touch pad selection, and the like. Link 124 can be only activatable thorough mouse selection and cannot be activatable through voice input.

Links 120 and 122 can be visually distinguished from link 124 through a visual marker. That is, a visual marker can indicate which links are speech-enabled. Any of a variety of indicators can be used as a visual marker including a distinctive font adjustment including, but not limited to, double underlining, highlighting, bordering the link within a box or other border, highlighting, adjusting the foreground color, adjusting the background color, altering the font, resizing, and the like. The visual marker can also include displaying an indicative graphic proximate to the link, converting the text section of the link from a text element to an activatable button, and any other visual indication that allows a user to distinguish from speech-enabled links and other links.

Browser 110 can also include a user-selectable toggle 119, such as a button or other graphical user interface (GUI) element. When the toggle 119 is enabled, visual markers can be displayed for speech-enabled links. When the toggle 119 is disabled, speech-enabled links can be displayed within browser 110 without the distinguishing visual markers. Thus, when the toggle 119 is disabled, speech enabled link 120 and speech enabled link 122 will be displayed in a fashion indistinguishable from the manner in which non-speech enabled links are displayed. In one embodiment, toggle 119 can additionally indicate the status of a microphone, so that a microphone for accepting speech input is turned on when the toggle 119 is enabled and turned off when the toggle 119 is disabled. In another embodiment, to conserve screen space, toggle 119 can be an overloaded interface option having at least one function unrelated to visual markers.

Visual markers can be used to indicate that other visual elements of browser 110 (in addition to hyperlinks) are speech-enabled elements. For example, a menu option 112, option 114, and/or a toolbar button (not shown) can be displayed with one or more of the visual markers that have been established for speech-enabled links. The visual marker need not be identical to the visual marker for speech-enabled links, but must have at least one common visual indicator. For instance, all speech-enabled elements (items 112, 114, 120, and 122) of browser 110 can be formatted as bold and double underlined text, while speech-enabled links 120 and 122 can also be formatted with a border.

Figure 2:
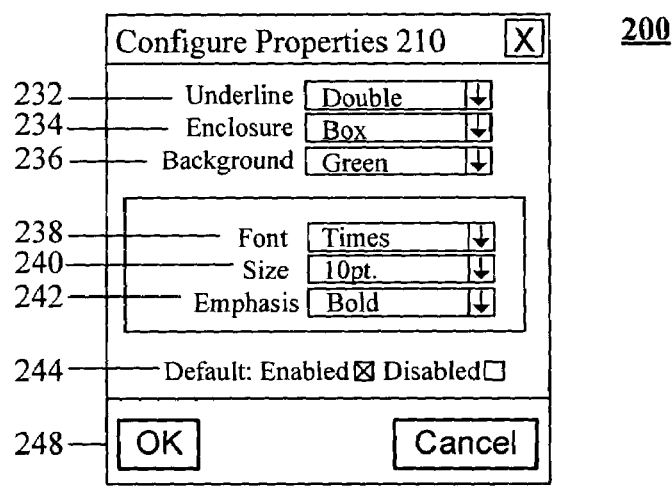
FIG. 2 is a schematic diagram of a visual interface permitting a user to configure behavior for visual markers in accordance with an embodiment of the inventive arrangements disclosed herein.

FIG. 2 is a schematic diagram of a visual interface 200 permitting a user to configure behavior for visual markers in accordance with an embodiment of the inventive arrangements disclosed herein. For example, visual interface 200 can include a pop-up configuration properties window 210, which can be associated with browser 110.

Configuration properties window 210 can include a number of user-adjustable options for configuring properties of visual markers. As shown, the adjustable options can include underline element 232, enclosure element 234, background element 236, font element 238, font size element 240, and emphasis element 242.

Configure properties window 210 can establish whether by default 244, visual markers should be displayed for speech-enabled links. After setting parameters within configure properties window 210, a user can select one of the buttons 248 to accept (OK button) or discard (Cancel button) the parameters.

Figure 3:
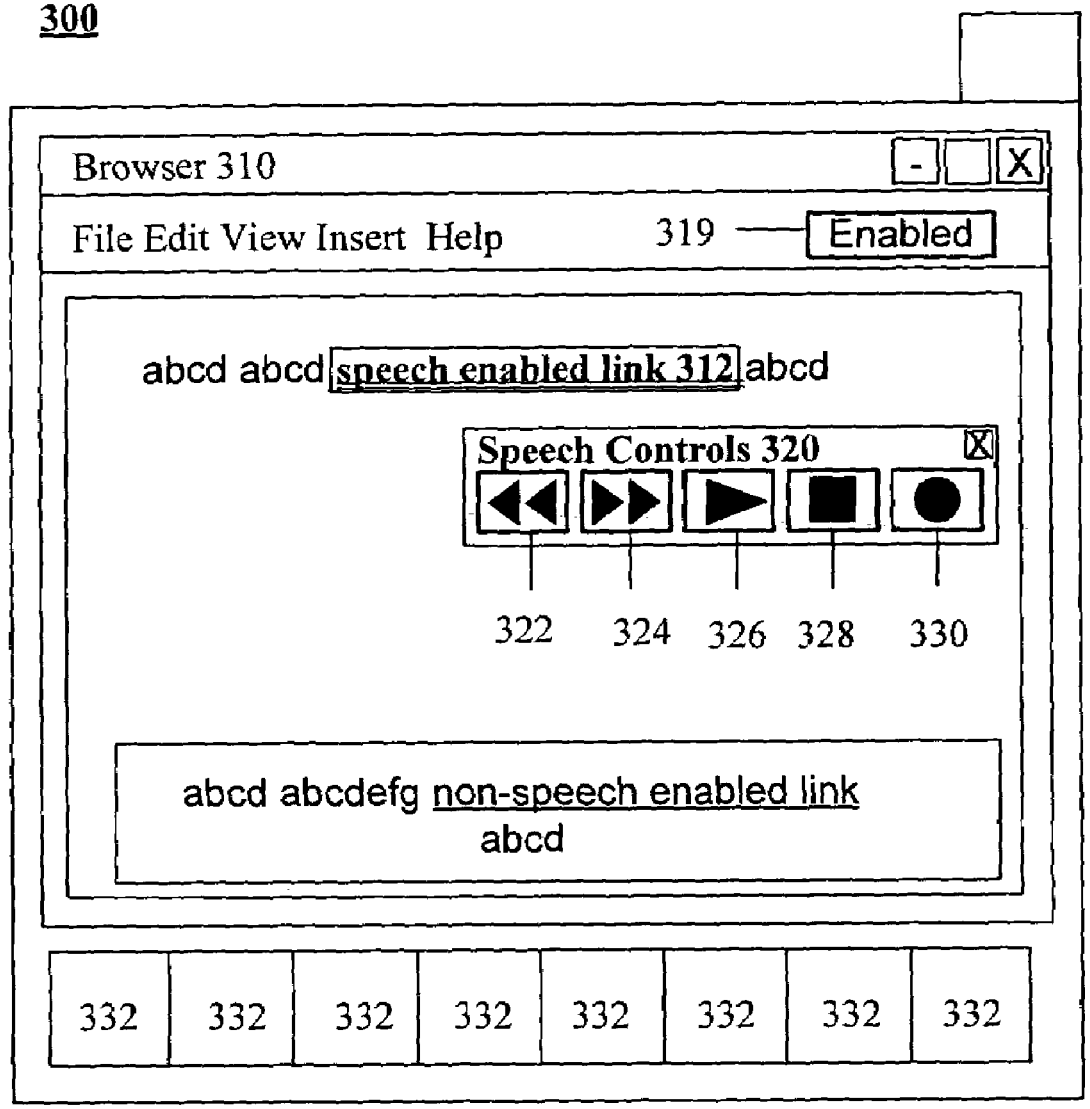
FIG. 3 is a schematic diagram of a mobile device having a visual interface where visual markers indicate that a hyperlink is activatable through voice input in accordance with an embodiment of the inventive arrangements disclosed herein.

FIG. 3 is a schematic diagram of a mobile device 300 having a visual interface where visual markers indicate that a hyperlink is activatable through voice input in accordance with an embodiment of the inventive arrangements disclosed herein. Mobile device 300 can include a personal data assistant, a smart phone, a mini-notebook, a portable gaming device, an embedded computing system, or any other system having limited screen real estate. It should be appreciated, however, that the controls, GUI, pop-up views, and mechanisms detailed herein for system 300 can be apply to any computing device having a graphical interface for presenting visual markers as described herein.

System 300 can include browser 310 configured to display content that includes hyperlinks. Selective ones of the hyperlinks can be speech-enabled links, while other links can be links that are not speech enabled. When toggle 319 is enabled, the speech enabled links can be displayed with distinguishing visual markers, as described in visual interface 100. When the toggle 319 is disabled, the distinguishing visual markers can be disabled so that speech enabled links will be displayed without the distinguishing visual markers.

One or more automated actions can also be triggered by the enablement/disablement of toggle 319. For example, a microphone for accepting audible input can be automatically enabled/disabled as the states of toggle 319 are altered.

In one embodiment, a popup mini-GUI window, such as speech controls 320 can be automatically displayed when toggle 319 is enabled. The speech controls 320 can provide one or more controls for accepting or playing speech. These controls be linked to one or more speech enabled links presented upon the screen. For example, actions enabled for speech controls 320 can be related to the speech enabled link 312 proximate to the speech controls 320. Controls can include, but are not limited to rewind control 322, fast forward control 324, play control 326, stop control 328, pause control (not shown), and record control 330. The controls appearing in speech controls 320 can be user configurable.

Positioning rules can be established so that a user can determine which of many possible speech enabled links are being controlled by speech controls 320. For example, when multiple speech enabled links are presented within browser 310, the speech controls 320 can be associated with the link 312 which is positioned immediately above the speech controls 320. The invention is not limited in this regard, however, and other rules, such as positioning the speech controls 320 above the associated link can be utilized in conjunction with the inventive arrangements disclosed herein. Rules for positioning of the speech controls 320 relative to the associated speech enabled link 312 can be user configurable to suit different preferences and/or device constraints.

Additionally one or more buttons 332 or elements of device 300 can be linked to the enablement state for visual markers. For example, toggle 319 can be implemented as a button 332 of device 300 and not as a GUI element displayed within browser 310. Additionally, buttons for the speech controls 320 can be present upon device 300. For example, the device can include buttons 332 for recording, playing, fast-forwarding, pausing, and the like.

The various buttons 322 can be automatically programmatically linked to speech-enabled links, when the visual markers are enabled and can otherwise perform other functions. For example, even though buttons 332 can perform the same functions as controls 322, 324, 326, 328, and 330 when visual markers are enabled, the buttons 332 can perform music-related functions or dictation functions that are unrelated to hyperlinks when visual markers are disabled.

Figure 4:
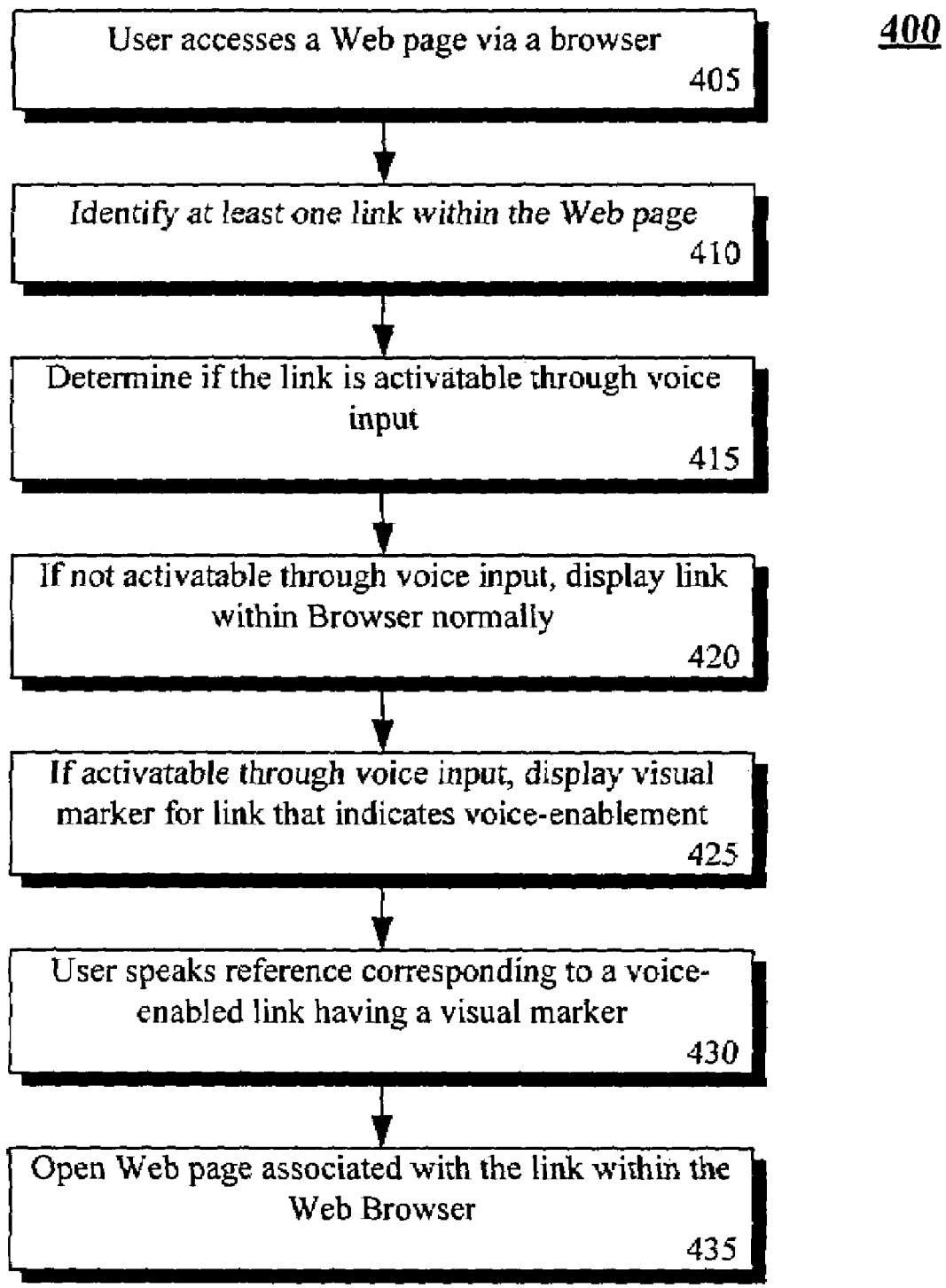
FIG. 4 is a flow chart of a method for displaying a visual marker to indicate a link is activatable through voice input in accordance with an embodiment of the inventive arrangements disclosed herein.

FIG. 4 is a flow chart of a method 400 for displaying a visual marker to indicate a link is activatable through voice input in accordance with an embodiment of the inventive arrangements disclosed herein. Method 400 can be performed in the context of any interface displaying links that can be used to navigate to a previously determined Web page or Web page location. For example, method 400 can be performed in the context of visual interface 100.

Method 400 can begin in step 405, where a user can access a Web page through a Web browser. In step 410, at least one link within the Web page can be identified. In step 415, a determination can be made as to whether the link is activatable through voice input. In step 420, if the link is not activatable through voice input, the link can be displayed with the browser in a normal fashion, meaning that the link is displayed in a manner established for typical links. For example, the link can be single underlined, bolded, and displayed with a blue foreground color.

In step 425, if the link is activatable through voice input, a visual marker for that link can be displayed that indicates the voice enablement of the link. In step 430, a user can reference a voice enabled link having a visual marker by speaking an appropriate utterance for the link. In step 435, a Web page associated with the link can be opened with the Web browser.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for notifying a user that a hyperlink is enabled for activation through a voice input comprising:

displaying, on a display of a device, a first visual marker for the hyperlink to indicate that the hyperlink is activatable through a click;

displaying, on the display of the device, a second visual marker for the hyperlink to indicate that the hyperlink is activatable through the voice input in addition to being activatable through the click, wherein the second visual marker is not displayed for the hyperlink when the hyperlink is not activatable through the voice input even if the hyperlink is activatable through the click, wherein the second visual marker is different from the first visual marker;

presenting a user interface for a user to turn on or off the second visual marker and configure characteristics of the second visual marker, wherein the configurable characteristics of the second visual marker includes an underline element, an enclosure element, a background element, a font element, a font size element, an emphasis element; and linking speech-related elements and functions of the device with activation status of the second visual marker so that the speech-related elements and functions are activated when the second visual marker is turned on and the speech-related elements and functions are deactivated when the second visual marker is turned off.

2. The method of claim 1, wherein the font adjustment includes a user configurable adjustment for at least one of font color, background color, font type, font size, font underlining characteristics, and font border.

3. The method of claim 1, further comprising:

receiving a user selection of an interface option for enabling visual markers for hyperlinks; and responsive to receiving the user selection, selectively toggling an enablement state for displaying the visual markers, wherein when the enablement state is enabled visual markers are displayed and when the enablement state is disabled visual markers are not displayed.

4. The method of claim 3, wherein the interface option is a button having at least two visual display states, wherein one of the visual display states indicates enablement and wherein another of the visual display states indicates disablement.

5. The method of claim 3, wherein the interface option is an overloaded interface option having at least one function unrelated to enabling visual markers.

6. The method of claim 1, wherein the visual marker and the hyperlinks are contained within a Web page that is displayed within a Web browser.

7. The method of claim 6, wherein the visual marker is used to indicate that other visual elements within the Web browser are enabled to accept voice input, said other visual elements including at least one of a menu option and an interface button.

8. A computer-readable medium, having stored thereon a computer program having a plurality of code sections executable by a computer for causing the computer to perform the step of:

displaying, on a display of a device, a first visual marker for a hyperlink to indicate that the hyperlink is activatable through a click;

displaying, on the display of the device, a second visual marker for the hyperlink to indicate that the hyperlink is activatable through the voice input in addition to being activatable through the click, wherein the second visual marker is not displayed for the hyperlink when the hyperlink is not activatable through the voice input even if the hyperlink is activatable through the click, wherein the second visual marker is different from the first visual marker;

presenting a user interface for a user to turn on or off the second visual marker and configure characteristics of the second visual marker, wherein the configurable characteristics of the second visual marker includes an underline element, an enclosure element, a background element, a font element, a font size element, an emphasis element; and linking speech-related elements and functions of the device with activation status of the second visual marker so that the speech-related elements and functions are activated when the second visual marker is turned on and the speech-related elements and functions are deactivated when the second visual marker is turned off.

9. A system for notifying a user that a hyperlink is enabled for activation through a voice input comprising:

a device with a display displayed thereon a visual interface having a first visual marker for the hyperlink to indicate that the hyperlink is activatable through a click and a second visual marker for the hyperlink to indicate that the hyperlink is activatable thorough a voice input, where the second visual marker is not displayed for the hyperlink when the hyperlink is not activatable through voice input even if the hyperlink is activatable through the click, wherein the second visual marker is different from the first visual marker; and a user interface for a user to turn on or off the second visual marker and configure characteristics of the second visual marker, wherein the configurable characteristics of the second visual marker includes an underline element, an enclosure element, a background element, a font element, a font size element, an emphasis element;

wherein speech-related elements and functions of the device are linked with activation status of the second visual marker so that the speech-related elements and functions are activated when the second visual marker is turned on and the speech-related elements and functions are deactivated when the second visual marker is turned off.

10. The system of claim 9, wherein the visual interface is an interface of a Web browser.

11. The system of claim 10, wherein the Web browser is a multi-modal Web browser enabled for speech input, keyboard input, and mouse input.

12. The system of claim 9, further comprising: an interface option for permitting a user to selectively enable the display of the at least one visual marker within the interface.

13. The system of claim 12, wherein the interface option is a displayed button within the interface having at least two button states, where different button states are displayed depending on whether the interface option is enabled or disabled.

14. The system of claim 9, wherein the font alteration includes a user configurable adjustment for at least one of font color, background color, font type, font size, font underlining characteristics, and font border.

15. The system of claim 9, wherein the visual marker is used to indicate that other visual elements within the user interface are enabled to accept voice input, said other visual elements including at least one of a menu option and an interface button.

\* \* \* \* \*